United States Patent
Kuratli (10) Patent No.: US 7,307,858 B2
(45) Date of Patent: Dec. 11, 2007

(54) POWER SUPPLY ARRANGEMENT FOR BATTERY POWERED DEVICE

(75) Inventor: Christoph Kuratli, Bern (CH)

(73) Assignee: Bernafon AG, Bern (CH)

( * ) Notice: Subject to any disclaimer, the term of this patent is extended or adjusted under 35 U.S.C. 154(b) by 328 days.

(21) Appl. No.: 10/515,582

(22) PCT Filed: May 27, 2003

(86) PCT No.: PCT/EP03/05558

§ 371 (c)(1),
(2), (4) Date: Feb. 3, 2005

(87) PCT Pub. No.: WO03/100951

PCT Pub. Date: Dec. 4, 2003

(65) Prior Publication Data

US 2006/0019721 A1    Jan. 26, 2006

(30) Foreign Application Priority Data

May 27, 2002   (EP)   ................... 02388037

(51) Int. Cl.
*H02M 3/06*  (2006.01)
(52) U.S. Cl. ............................ 363/62; 363/63; 307/110
(58) Field of Classification Search .................. 363/62, 363/63; 307/110
See application file for complete search history.

(56) References Cited

U.S. PATENT DOCUMENTS

| | | | |
|---|---|---|---|
| 4,397,563 A | * | 8/1983 | Ichinose ..................... 368/204 |
| 4,433,282 A | * | 2/1984 | Squires ....................... 323/281 |
| 4,509,193 A | | 4/1985 | Carlson |
| 4,868,908 A | | 9/1989 | Pless et al. |
| 5,345,376 A | * | 9/1994 | Nourbakhsh ................. 363/62 |
| 5,457,421 A | | 10/1995 | Tanabe |
| 5,532,916 A | * | 7/1996 | Tamagawa ................... 363/62 |
| 5,581,454 A | * | 12/1996 | Collins ........................ 363/59 |
| 5,680,300 A | * | 10/1997 | Szepesi et al. ............... 363/59 |
| 5,717,318 A | | 2/1998 | Matsuda et al. |
| 5,940,285 A | * | 8/1999 | Carrere et al. ............... 363/62 |

* cited by examiner

*Primary Examiner*—Bao Q. Vu
(74) *Attorney, Agent, or Firm*—Dykema Gossett PLLC

(57) ABSTRACT

A battery powered headworn communication device and a method for conversion of a battery voltage in a battery powered headworn communication device, which includes providing a voltage reduction to a fixed part of the input voltage and providing a variable reduction that ensures that a minimum voltage is maintained. Preferably, the fixed part reduction and the variable reduction are performed in parallel and the fixed voltage conversion is a ⅔ conversion of the input voltage. A fixed voltage conversion and the variable conversion can be balanced according to the actual battery voltage.

13 Claims, 7 Drawing Sheets

POWER SUPPLY ARRANGEMENT FOR BATTERY POWERED DEVICE

The invention relates to the area of power supply systems for use in connection with battery powered headworn communication devices. More specifically the invention relates to power supply systems where the battery voltage is higher than desired and therefore need to be reduced. Such battery-powered devices may be hearing aids, telephone headsets and other mobile devices.

BACKGROUND OF THE INVENTION

In connection with battery powered headworn communication devices it is previously known to use a switched mode power supply based on a class-D driver and an external LC-lowpass filter. This solution has a good efficiency but suffers from a variety of problems due to the presence of an inductor, which gives rise to magnetic interference, stability problems and in some cases size problems. Another idea is to use a switched capacitor step down converter, which in no-load condition would linearly transform the battery voltage to a fraction of it. In principle, this would have a satisfactory function, however, for battery voltages below a certain voltage the output supply can no longer be guaranteed to be the desired. Low battery voltage may occur gradually or instantaneously (sudden load changes) during lifetime of the battery. A third possibility is to use linear regulators to provide a lower voltage than the battery voltage, however a drawback for such conversion is that the energy efficiency is poor. High efficiency is however a very important aspect for battery operated applications where lifetime of the battery may be crucial for the individual in need of such battery-operated device.

The objective of the invention is therefore to provide a power conversion method and system for battery operated applications, where the energy efficiency is improved compared to previously known linear regulator systems, which does provide a stable power supply and which still is capable of maintaining a sufficient voltage for the battery operated application.

SUMMARY OF THE INVENTION

According to the invention this objective is achieved by means of the method as defined in claim 1.

By performing the conversion in this manner there has been provided an opportunity for a more energy efficient conversion than hitherto known in connection with battery powered headworn communication devices. The conversion may be performed in a stable manner and a sufficient voltage can be maintained during the lifetime of the battery.

Advantageous embodiments are defined in the dependent claims 2-5.

By the embodiment set forth in claim 2 the two systems are operated in parallel hereby enabling a simple implementation.

The reduction fraction is preferably ⅔, but in principle any fraction may be achieved.

By balancing the fixed part voltage conversion and the variable part conversion, a possibility of optimising the efficiency of the system may be achieved. In a system comprising a switched capacitor part this is preferably done by setting the clock frequency of the switched capacitor part.

Further according to the invention the objective is achieved by means of the system as defined in claim 6.

By means of the system defined in claim 6 the same advantages as mentioned in connection with the method may be achieved.

Advantageous embodiments are defined in the dependent claims 7 to 11 hereby achieving the same advantages as defined above in connection with the method according to the invention.

The invention will be described more detailed in connection with the following description of a preferred embodiment with reference to the drawings.

DESCRIPTION OF A PREFERRED EMBODIMENT

It should be appreciated that the system in principle can be adapted to any input and output voltages and still have the same advantages as in the specific example. The example shown is related to a battery powered headworn communication device, and more specifically to a hearing aid or a headset.

The SC step down converter provides a power efficient conversion of the battery voltage by a factor of e.g. ⅔while the linear regulator ensures operation of the digital supply at low battery voltages. This technique as explained in the following allows significant saving of battery current compared to a supply based on a pure linear regulator.

The (high) battery voltage should power efficiently be transformed to a pre-defined lower supply voltage, which can be provided by a SC step down converter. This SC-power converter can however not guarantee sufficient output voltage at a low battery supply. A combination of a linear and a switched capacitor supply is therefore proposed here, where at low battery voltage the linear regulator gradually takes over the load current while maintaining the required supply voltage.

Figure 1A:
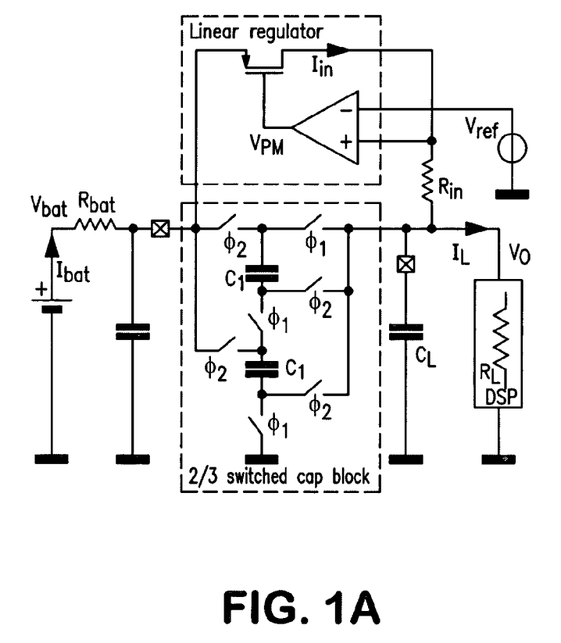
FIG. 1A and FIG. 1B are block diagrams showing a combined switched capacitor/linear DC/DC power supply.
Figure 1B:
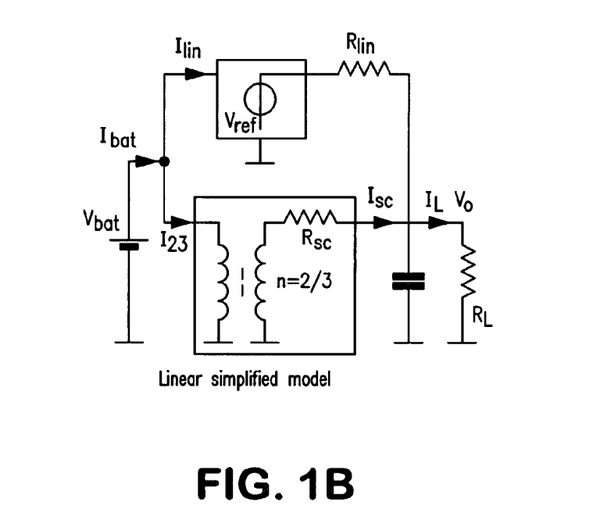

FIG. 1A shows the block diagram of the proposed supply FIG. 1B shows a simplified equivalent model. It consists of a ⅔-switched capacitor step down converter plus a linear regulator, which are connected in parallel. The switched capacitor part, whose detailed operation will be described later, can be considered as an ideal transformer applied to the battery with turn ratio n=⅔and an equivalent resistor $R_{sc}$. On the other hand, the linear regulator can be seen as fixed voltage source $V_{ref}$ with a (low-impedance) output resistance $R_{lin}$. When connected in parallel, both of the two parts contribute to the overall load current $I_L = I_{sc} + I_{lin}$ with decreasing current $I_{lin}$ (linear regulator) for an increasing battery voltage $V_{bat}$. Above a critical battery voltage $V_{bat,crit}$, $I_{lin}$ becomes zero and the load will only be supplied by the switched capacitor part. The advantage of such a combined scheme is that for battery voltages around $V_{bat,crit}$ a power supply is provided by a high efficient DC/DC converter while the linear regulator guarantees a certain minimum voltage $V_o = V_{ref}$. At battery voltages higher than $V_{bat,crit}$ the good efficiency is preserved, however, the output voltage is linearly increased due to the aforementioned transformer characteristics. For some applications, this might not be desired. A slightly more complex system, which automatically adapts the frequency dependent equivalent output resistance $R_{sc}$ of the SC-regulator to the actual load, can maintain good efficiency while keeping the output voltage constant. This is described later.

Figure 2:
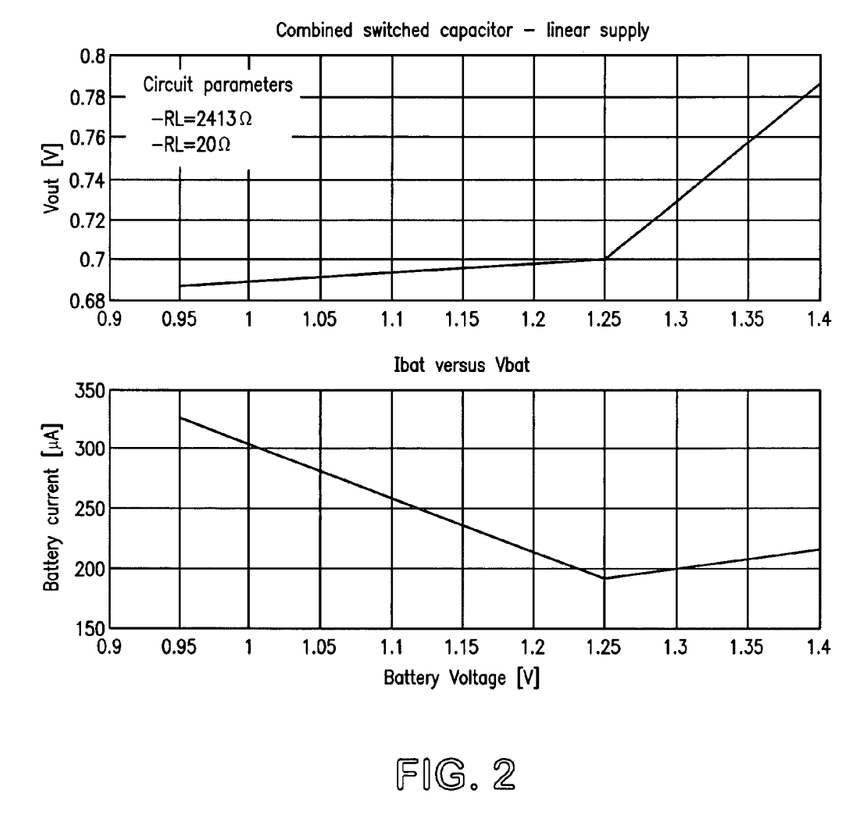
FIG. 2 shows typical DC transfer characteristics for the system according to the invention.

The DC transfer characteristics of the described combined digital supply is shown in FIG. 2. These are based on a simulation using the schematic of FIG. 1 with ideal switches, capacitors and resistors.

Figure 3:
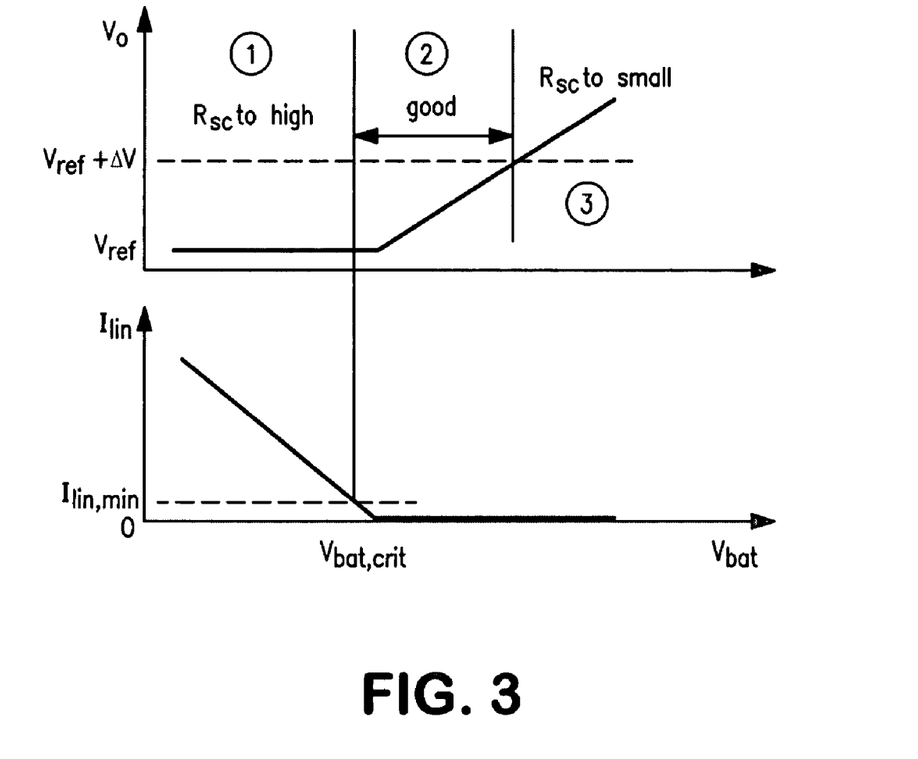
FIG. 3 shows output current and voltage in the linear regulator as part of the overall supply system.

As already mentioned above, the operation of the proposed SC-digital supply can be divided in two operation modes (reference is made to FIG. 3):

Mode 1: $V_{bat} > V_{bat,crit}$: Only switched capacitor is active. Output voltage $V_o$ scales linearly with supply voltage Mode 2: $V_{bat} \leq V_{bat,crit}$: Both linear and switched capacitor part are active. Output voltage $V_o$ is constant around $V_{ref}$.

For $R_{lin} \to 0$ the DC characteristics can be described as follows:

Mode 1 ($V_{bat} > V_{bat,crit}$)

$$V_0 = \frac{2}{3} \cdot V_{bat} \cdot \frac{R_L}{R_L + R_{SC}} \qquad (1)$$

Mode 2 ($V_{bat} \leq V_{bat,crit}$)

$$V_o = V_{ref} \qquad (2)$$

$$I_{bat} = I_{bat,sc} + I_{bat,lin} = \frac{1}{R_{SC}} \left[ V_{ref} \left( \frac{1}{3} + \frac{R_{SC}}{R_L} \right) - V_{bat} \cdot \frac{2}{9} \right] \qquad (3)$$

$$I_{bat,sc} = \frac{2/3}{R_{SC}} \cdot \left[ \frac{2}{3} \cdot V_{bat} - V_{ref} \right] \qquad (4)$$

$$I_{bat,lin} = \frac{1}{R_{SC}} \left[ V_{ref} \cdot \left( 1 + \frac{R_{SC}}{R_L} \right) - \frac{2}{3} \cdot V_{bat} \right] \qquad (5)$$

Where $I_{bat}$ is the overall battery current, $I_{bat,sc}$ is the battery current contribution of the switched capacitor part and $I_{bat,lin}$ is the current contribution of the linear regulator.

The critical battery voltage $V_{bat,crit}$ (see FIG. 2) can be derived from equation (5) when setting $I_{bat,lin}$ to zero:

$$V_{bat,crit} = V_{ref} \cdot \frac{3}{2} \left( 1 + \frac{R_{SC}}{R_L} \right) \qquad (6)$$

The above equations can be used to dimension the SC-digital supply such that its overall efficiency is optimal. The most critical parameter hereby is the knee-point at $V_{bat} = V_{bat,cit}$. Above this voltage the linear regulator is inactive and the overall efficiency is maximum. $V_{bat,crit}$ should be centered around the typical battery voltages, which can vary from battery type to battery type.

If desired, the supply may be configured such that it provides good power efficiency over a wide range of load currents, (which might change dynamically during lifetime of the battery), whereby the above system can be made more flexible. In principle, this can be done by adapting $R_{sc}$ the same amount as the load resistor changes, as the critical battery voltage $V_{bat,crit}$, where efficiency is best, depends on the load resistor $R_L$ and the switched capacitor resistor $R_{sc}$. To keep $V_{bat,crit}$ to be at the optimum independent of the load current, the impedance $R_{sc}$ can be changed by setting the clock frequency $f_{sc}$ appropriate. As an example, one can say: if the load current is doubled, the clock frequency $f_{sc}$ should also be doubled, which then effectively reduces $R_{sc}$ by a factor two.

By measurement in the system which tells us whether the supply block operates close to optimum or not the frequency dependent sc-resistor $R_{sc}$ may be changed, such that this optimum is achieved.

FIG. 3 depicts a scheme, which provides this information. The top graph shows the output vs. battery voltage whereas the bottom graph depicts the current delivered by the linear regulator. There are three regions of operation. In region 1 the sc-resistor $R_{sc}$ is too high such that current partly has to be provided by the linear regulator. Region 2 is optimal since there is no linear current and the output voltage is close to the target voltage $V_{ref}$. In region 3, however, the impedance $R_{sc}$ is too low, leading to an (undisirable) increase of the output voltage. The distinguishing of the three regions can be done by voltage and current comparators:

Voltage comparator for regions 2 and 3: provides a logic high if $V_o < V_{ref} + \Delta V$, Current comparator for regions 1 and 2: provides a logic high if $I_{lin} < I_{lin,min}$.

Figure 4:
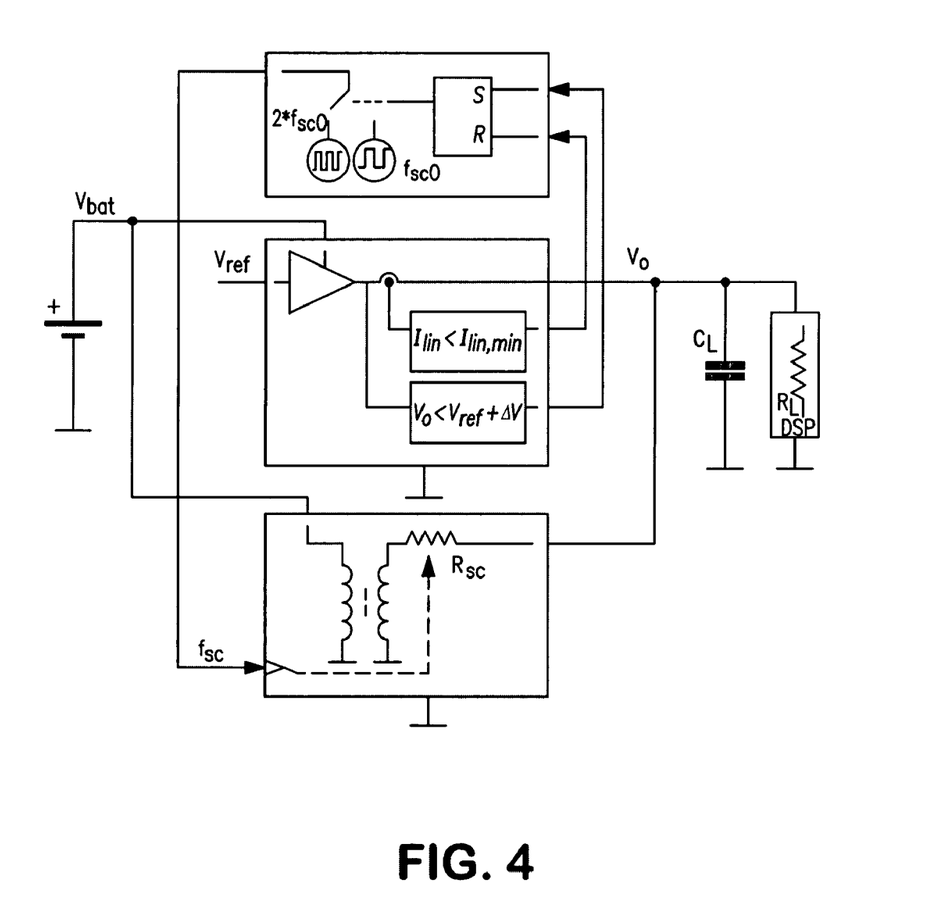
FIG. 4 is a block diagram showing an automatic adapting system.

By using the signals provided by these two comparators, a feedback loop may be provided in the system, which automatically changes $R_{sc}$ through the clock frequency $f_{sc}$. An implementation of such a feedback loop is shown in FIG. 4. If the current comparator goes high ($R_{sc}$ to low), $R_{sc}$ will be increased. The effect then is that the system may slowly oscillate between the borders of the good region (2), depending on the load. Time constant of the oscillation is set by the decoupling capacitor $C_L$, the load $R_L$ and the sc-resistor $R_{sc}$.

Figure 5:
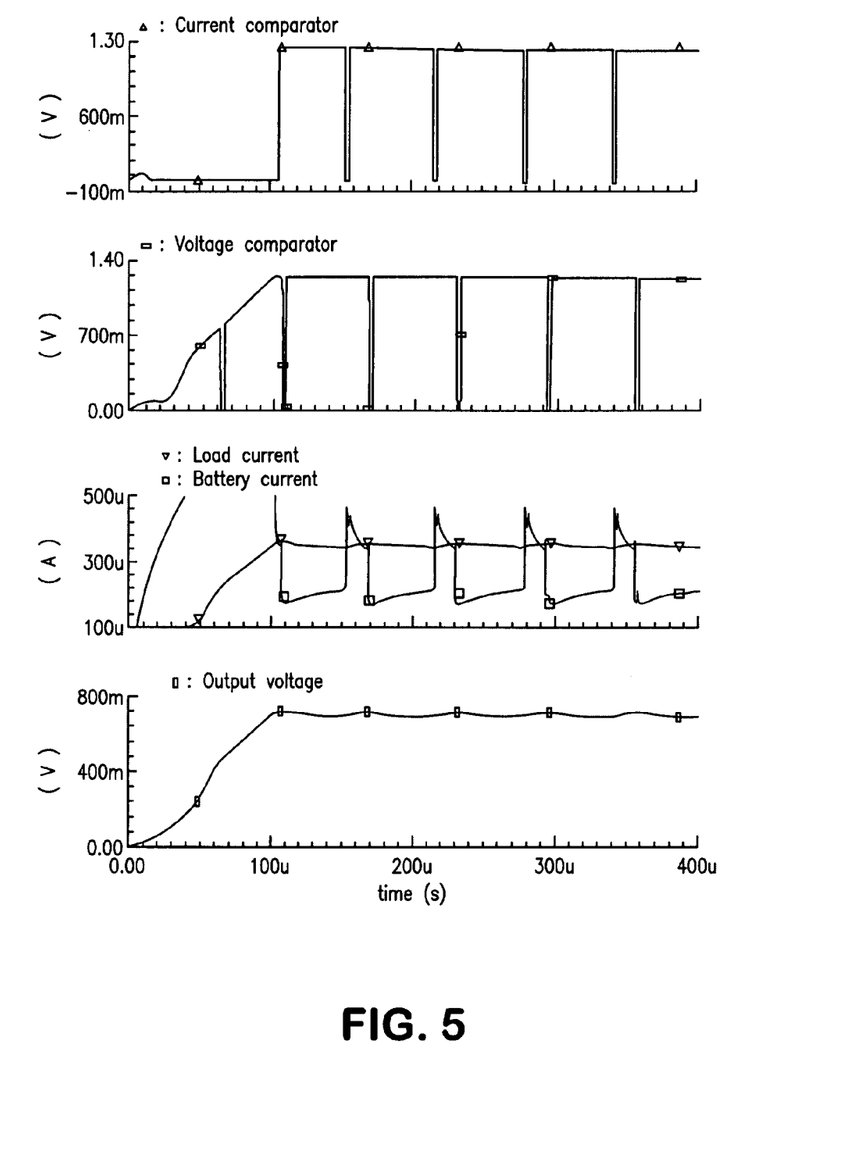
FIG. 5 shows behaviour of voltages and currents in an automatically adapting system.

As an example, FIG. 5 shows a behavioural simulation of this adaptive system, when a load current is applied. The bottom trace of the figure shows the output voltage oscillating within a small ripple around $V_{ref}$. The transient battery current, shown in the third trace, jumps between the two current levels defined by the sc-resistor $R_{sc}$. In the top part of the figures the waveforms of the two comparators are shown, indicating in which region of operation the system is working (see explanation above).

Figure 6:
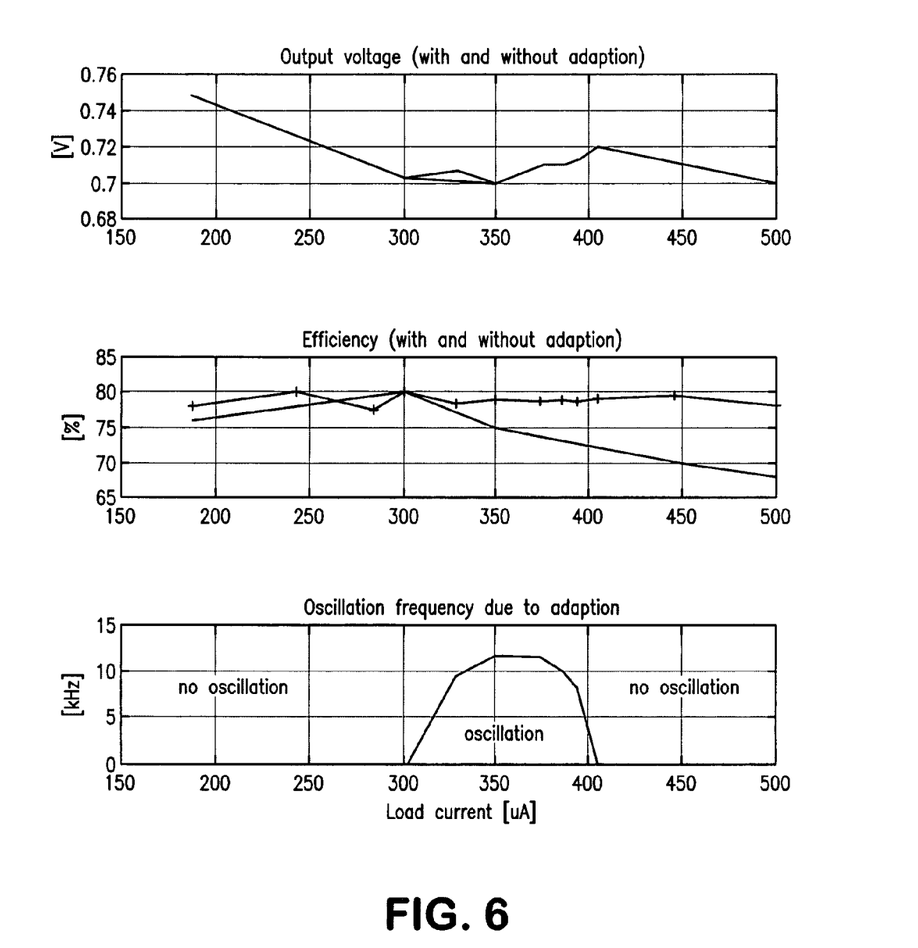
FIG. 6 shows behaviour of an automatically adapting system using transistor level schematics.

FIG. 6 shows simulation results using a full transistor level schematic for the regulator system. Top trace is the output voltage for load currents varying between 180 µA . . . 500 µA. In the middle trace the efficiency is plotted, both for the adaptive and the non-adaptive voltage supply. In the lower trace the oscillation frequency of the aforementioned ripple is shown, appearing between 300 µA . . . 400 µA of load current.

Figure 7:
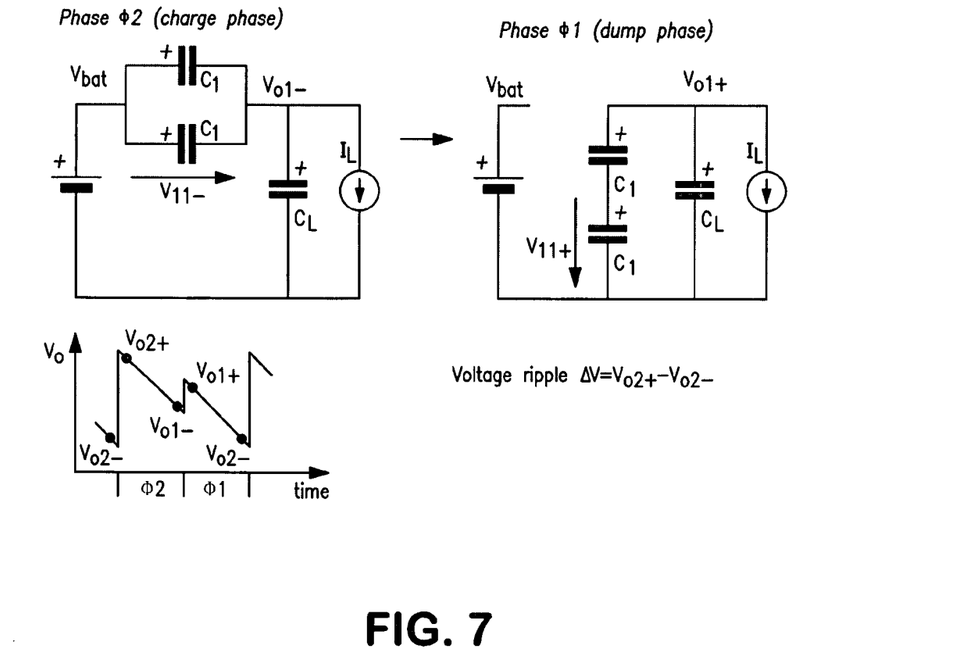
FIG. 7 shows basic operating principle of ⅔switched capacitor step down converter.

To understand the basic operating principle of the ⅔ switched capacitor DC/DC converter, FIG. 7 provides some background. The switched capacitor circuit is periodically switched back and forth between the two phases (φ2) "charge phase" and (φ1) "dump phase", from which FIG. 7 shows the transient between φ2 to φ1. In the charge phase, both capacitors $C_1$ are configured in parallel and put in series to the load capacitor $C_L$. Charge is flowing from the battery to both $C_1$ and $C_L$ and the output becomes $V_{o1-} = V_{bat} - V_{11}$, where $V_{11}$, is the voltage across $C_1$. In the dump phase, the capacitors $C_1$ are the configured in series to the load capacitor $C_L$, in order to arrive at $V_{o1+}=2*V_{11+}$. In no load condition ($I_L=0$) the output voltage does not change from phase to phase, hence $V_{o1+}:=V_{o1-}$ and $V_{11+}:=V_{11-}$. This can only be satisfied for $V_o$ being exact $\frac{2}{3}*V_{bat}$.

When a load current $I_L$ is applied to the $\frac{2}{3}$SC-DC/DC converter, the settled output voltage $V_o$ no longer is exactly $\frac{2}{3}*V_{bat}$ and a voltage pattern as shown in the bottom of FIG. 7 is achieved. It can be shown that for large load caps $C_L \gg C_1$, the following expression for the output voltage may be used:

$$V_0 = \frac{2}{3} \cdot V_{bat} - R_{SC} \cdot I_L \qquad (7)$$

where $f_{sc}=1/T$ is the switching frequency and $R_{sc}$ is the equivalent switched capacitor impedance of the $\frac{2}{3}$converter. The voltage ripple $\Delta V = V_{o1+} - V_{o1}$ can be determined to be proportional to $R_{sc}$ and the load current $I_L(C_L \gg C_1)$:

$$\Delta V \propto R_{SC} \cdot I_L \qquad (8)$$

The invention claimed is:

1. A method for conversion of a battery voltage in a battery operated system, the method comprising;
   providing a voltage reduction to a fixed part of the input voltage using a switched capacitor conversion element, an equivalent model for which comprises an equivalent output resistor $R_{sc}$, and
   providing a variable reduction that ensures that a minimum voltage is maintained,
   providing that the fixed part reduction and the variable part reduction are performed in parallel, so that the load current is a sum of the fixed reduction part $I_{sc}$ and the variable reduction part $I_{lin}$, and
   providing a feedback loop from the variable reduction part to the fixed reduction part for adapting the equivalent output resistance $R_{sc}$ to the actual load of the system whereby the battery efficiency is automatically optimized.

2. A method according to claim 1, wherein the fixed voltage conversion is a $\frac{2}{3}$ conversion of the input voltage.

3. A method according to claim 1, wherein the switched capacitor equivalent output resistance $R_{sc}$ is controlled by setting the clock frequency of the switched capacitor voltage reduction system.

4. A method according to claim 1, wherein the contribution to the load current from the variable reduction part $I_{lin}$ decreases for an increasing battery voltage $V_{bat}$, becoming substantially zero at a critical battery voltage $V_{bat,crit}$ so that only the fixed reduction part is active for $V_{bat} > V_{bat,crit}$.

5. A method according to claim 4, wherein the feedback loop is adapted to determine the critical battery voltage $V_{bat,crit}$.

6. A method according to claim 1, wherein $R_{sc}$ is adapted to provide that the critical battery voltage $V_{bat,crit}$ is substantially equal to a typical battery voltage for the battery type in question.

7. A voltage conversion system for converting battery voltage in a battery operated system, the voltage conversion system comprising a switched capacitor conversion element for providing a voltage reduction to a fixed part of input voltage; means arranged in parallel therewith so that the load current is a sum of the fixed reduction part $I_{sc}$ and the variable reduction part $I_{lin}$ and providing a variable reduction that ensures that a minimum voltage is maintained, wherein an equivalent model for the switched capacitor conversion element comprises an equivalent output resistor $R_{sc}$; and a feedback loop from the variable reduction means to the switched capacitor conversion element for adapting the equivalent output resistance $R_{sc}$ to the actual load of the system whereby the battery efficiency is automatically optimized.

8. A voltage converter conversion system according to claim 7, wherein the switched capacitor conversion element is adapted to perform a $\frac{2}{3}$ conversion of the input voltage.

9. A battery operated device comprising a voltage converter conversion system according to claim 7, wherein the equivalent output resistor $R_{sc}$ of the switched capacitor is balanced in relation to the load current by controlling the switched capacitor system frequency.

10. A hearing aid operating at a voltage lower than the battery voltage comprising a voltage conversion system according to claim 7.

11. A voltage conversion system according to claim 7, adapted to provide that the contribution to the load current from the variable reduction part $I_{lin}$ decreases for an increasing battery voltage $V_{bat}$ becoming zero at a critical battery voltage $V_{bat,crit}$.

12. A voltage conversion system according to claim 7, wherein the feedback loop comprises a current comparator and a voltage comparator adapted to determine the critical battery voltage $V_{bat,crit}$.

13. A hearing aid comprising a voltage conversion system according to claim 7.

* * * * *